United States Patent
Beier et al.

[19]

[11] Patent Number: 5,953,475
[45] Date of Patent: Sep. 14, 1999

[54] FIBER OPTIC PLUG CONNECTOR

[75] Inventors: Axel Beier; Hans-Dieter Weigel, both of Berlin, Germany

[73] Assignee: Siemens Aktiengesellschaft, Munich, Germany

[21] Appl. No.: 09/033,144

[22] Filed: Mar. 2, 1998

Related U.S. Application Data

[63] Continuation of application No. PCT/DE96/01659, Sep. 1, 1995.

[30]     Foreign Application Priority Data

Sep. 1, 1995 [DE] Germany .......................... 195 33 500

[51] Int. Cl.[6] ....................................................... G02B 6/36
[52] U.S. Cl. ................................ 385/76; 385/78; 385/60; 385/139
[58] Field of Search .................................. 385/76, 78, 60, 385/139, 140, 31, 39, 52, 53, 88, 89

[56]              References Cited

U.S. PATENT DOCUMENTS

| 4,687,288 | 8/1987 | Margolin et al. .......................... 385/78 |
| 4,712,860 | 12/1987 | Corrales ..................................... 385/60 |
| 5,293,582 | 3/1994 | Beard et al. ............................... 385/78 |
| 5,311,609 | 5/1994 | Abe ............................................ 385/60 |
| 5,796,898 | 8/1998 | Lee ............................................ 385/78 |
| 5,818,992 | 10/1998 | Aloisio, Jr. et al. ...................... 385/76 |

FOREIGN PATENT DOCUMENTS

| 0297439A2 | 1/1989 | European Pat. Off. . |
| 0330399A1 | 8/1989 | European Pat. Off. . |
| 0597501A1 | 5/1994 | European Pat. Off. . |
| 2811404 | 9/1978 | Germany . |

*Primary Examiner*—Phan T. H. Palmer
*Attorney, Agent, or Firm*—Herbert L. Lerner; Laurence A. Greenberg

[57]                ABSTRACT

The fiber optical plug connector has a pin, a helical spring bearing against the pin with a rearward axial force and a one-piece housing with a closed front segment and a through opening. A side wall opening behind the front segment allows the pin fitted with the helical spring to be inserted. Holding elements secure the pin and/or the helical spring from being displaced radially outward after the plug and the spring have been snapped into radial alignment.

4 Claims, 1 Drawing Sheet

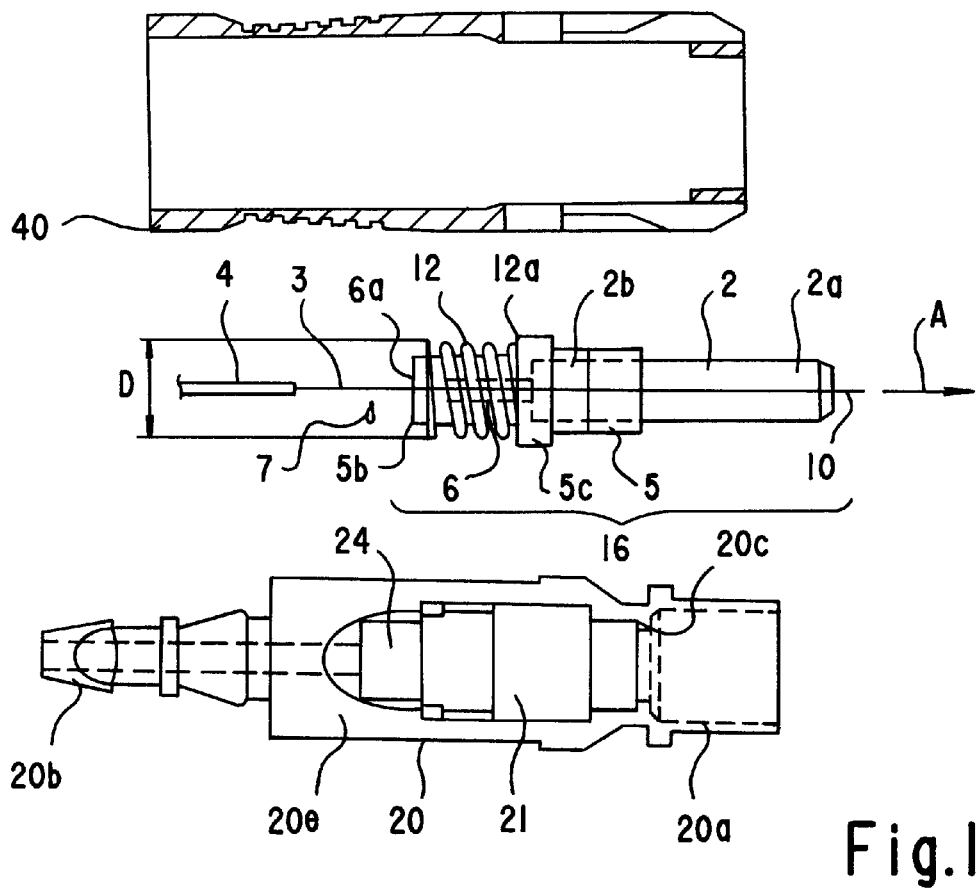
Fig.1
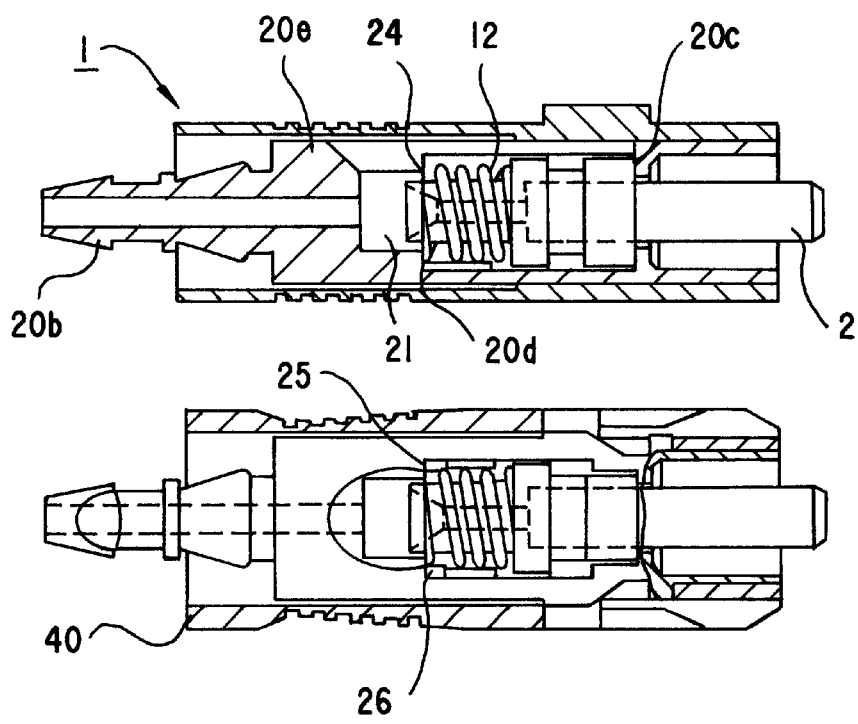
Fig.2
Fig.3

FIBER OPTIC PLUG CONNECTOR

CROSS-REFERENCE TO RELATED APPLICATION

This application is a continuation of copending international application PCT/DE96/01659, filed Sep. 1, 1995, which designated the United States.

BACKGROUND OF THE INVENTION

1. Field of the Invention

The invention relates to fiber optics. More specifically, the invention pertains to an optical connector for optically connecting a fiber optic cable, which normally comprises a cable sheath surrounding strength members and one or more optical fibers individually surrounded by buffer cladding.

2. Description of the Related Art

European published application EP-0 330 399 A1 discloses a connector in which a stripped optical fiber end on the coupling side extends in a central longitudinal bore of a plug pin. The rear end of the plug pin in the plug-in direction is held by a pin holder with a rear extension onto which there is pushed one end of a helical spring which is concentric with the longitudinal axis of the plug pin. The connector assembly is axially inserted into a central bore of a first housing part, i.e. the forward housing part in the plug-in direction. The other end of the helical spring is supported on a second, rear housing part with a central bore in which the optical fiber extends towards the cable. The plug pin assembly is securely retained in the housing shell produced by connecting the two housing parts.

European published application EP 0 597 501 A1, in the context of an electrooptical module and a plug system for forming a standardized SC twin plug, describes accessories which are based on specifically modified plug system components. In addition to twin plugs for cleaning purposes there is disclosed a terminating plug (FIG. 20) with two separate spring-loaded plug pins. The plug pins can be inserted laterally with their springs into two individual plug frames whose top wall has been removed for the purpose. After being inserted, the plug pins must be fixed by separate holding parts in their respective plug frames at least until the latter have been inserted axially into a common standardized double plug housing.

Prefabrication in conjunction with the protection of the plug assembly by a component specific to the connector is not possible with the prior art connector. Moreover, the prior art connector requires at least two housing parts, which form the overall housing and have to be individually produced, handled and connected.

SUMMARY OF THE INVENTION

It is accordingly an object of the invention to provide a fiber optic plug connector, which overcomes the above-mentioned disadvantages of the heretofore-known devices and methods of this general type and which provides for a prefabricated connector which is constructed in a particularly simple way with few individual parts.

With the foregoing and other objects in view there is provided, in accordance with the invention, a fiber optic plug connector, comprising:
a plug assembly including
    a plug pin for holding an end of an optical fiber aligned along a plug pin axis, the plug pin having a forward end defined by a plug-in direction and a rear end; and
    a helical spring concentrically surrounding the plug pin at the rear end thereof
a single-piece housing for receiving therein the plug assembly, the housing including
    a radially closed front segment formed with a through opening in which the plug pin is axially displaceably mounted against a force of the helical spring;
    a housing side wall axially behind the front segment in the plug-in direction, the side wall having an opening formed therein through which the plug assembly is laterally insertible into the housing; and
    holding elements retaining the plug assembly in the housing and preventing the plug pin from being radially displaced, the holding elements being elastic projections of the housing projecting radially inwardly in the opening.

In accordance with an additional feature of the invention, the plug assembly further comprises a pin holder holding the plug pin at the rear end thereof, and wherein the helical spring is slipped onto the pin holder.

In accordance with an added feature of the invention, the holding elements are tabs integrally formed on the housing side wall.

In accordance with a concomitant feature of the invention, the helical spring has a given outer diameter, the holding elements are spaced apart by less than the outer diameter of the helical spring, and holding elements bear against the helical spring.

In other words, the object of the invention is satisfied with an optical connector having a plug assembly which comprises: a plug pin for holding an optical fiber end and a helical spring which is concentric with the longitudinal axis of the plug pin and is pushed onto the rear end of the plug pin or of a pin holder holding the plug pin; the connector also has a one-piece housing with a radially closed front segment and with a through opening in which the plug pin is mounted axially displaceably against the force of the helical spring; a lateral opening is formed in the housing side wall behind the front segment through which the plug assembly can be inserted laterally into the housing and then pivoted in the plug-in direction so as to align the pin plug; holding elements are provided which prevent the plug pin and/or the helical spring from being displaced radially. A substantial advantage of the connector according to the invention consists in that, after insertion into the housing, pivoting for alignment onto the plug-in axis and subsequent latching by the holding elements, the plug pin, the helical spring and, if appropriate, the pin holder (plug assembly) already form a prefabricated assembly which can be handled as a unit during the subsequent production steps. It is thereby possible to hold ready diverse prefabricated plug pin assemblies which can be inserted immediately and which can be provided in a supplementary concluding work operation in a conventional manner with the optical fiber, which is stripped at the ends and is to be inserted from the back.

The disclosed holding elements are particularly advantageous in terms of production and expense. The holding elements are elastic projections of the housing, which are directed radially inward in the opening, are spaced apart by less than the outside diameter of the helical spring and bear against the helical spring. The elastic projections of the housing can be expanded elastically upon insertion of the plug module and, with the module inserted, spring back into their position holding the helical spring in the through opening.

Other features which are considered as characteristic for the invention are set forth in the appended claims.

Although the invention is illustrated and described herein as embodied in an optical connector, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing figures.

BRIEF DESCRIPTION OF THE DRAWING

FIG. 1 is a partly sectional and partly elevational view of the essential components of the connector according to the invention, in a separated state;

FIG. 2 is a longitudinal sectional view through a connector with the individual parts of FIG. 1 in an assembled state; and FIG. 3 is a partly sectional, partly broken away view of the connector according to the invention.

DESCRIPTION OF THE PREFERRED EMBODIMENTS

Referring now to the figures of the drawing in detail, there is seen a connector 1 which comprises a plug pin 2 (also referred to as an alignment ferrule), which surrounds one end 3 of a stripped optical fiber 4, which is represented schematically. The fiber 3 is insertible into a non-illustrated axial through bore (not visible) of the plug pin 2 until it emerges from the coupling-side end 2a of the plug pin 2. The rear end 2b of the plug pin 2, relative to the plug-in direction A, is held by an injection molded pin holder 5. The pin holder 5 has a rear extension 5b formed with a through bore 6 which is aligned with the plug pin bore and which ends in a rear insertion funnel 6a. Before the insertion of the end 3, a suitable quantity of adhesive 7 can be applied in the insertion funnel 6a. A helical spring 12 is axially pushed onto the rear end 5b of the pin holder 5. The spring 12 is concentric with the longitudinal axis (plug-in axis) 10 of the plug pin 2 and is supported with one end 12a on a shoulder 5c of the pin holder 5. The module formed from the plug pin 2, the bearing 5 and the spring 12 is also designated as plug assembly 16.

The connector also comprises a single-piece housing 20 with a radially closed front segment 20a. The front segment is closed by a circumferential lateral surface and has an inwardly projecting stop ring 20c. The housing 20 has an axial through opening 21 which has in the front region a volume suitable for holding the plug assembly 16, and which tapers in the rear region 20b to a diameter which holds the clad optical fiber 4. The plug pin is accessible for coupling at the front and can be displaced axially against the force of the spring 12, which is supported on a shoulder 20d of the housing 20. An opening 24 is located behind the radially closed front segment 20a, as seen in the plug-in direction A, which is formed in a side wall 20e and through which the plug pin 2 (the plug assembly 16) provided with the helical spring 12 and the pin holder 5 can be inserted laterally into the housing 20. When the plug assembly 16 is inserted, the coupling-side end 2a of the plug 2 is firstly inserted into the housing 20 and guided in the plug-in direction A into the front segment 20a; the plug pin and the pin holder 5 are aligned in the plug-in direction A by subsequently being pivoted. The spring 12 is held in an aligned position by holding elements 25, 26, which latch behind the helical spring. In the region of the opening 24, the holding elements 25, 26 project radially inward into the through opening 21 and are spaced apart such that the clear width between them is less than the outside diameter D of the helical spring. The holding elements are constructed elastically as projections of the housing 20, so that their clear spacing can be briefly and temporarily extended beyond the measure of the outside diameter D.

The connector permits preassembly and prefabrication of the plug assembly formed from the plug pin, if appropriate the pin holder, and the helical spring independently of the remaining subassemblies, in particular the optical fiber and the fiber optic cable. Independently of this module, the fiber optic cable can be prepared and fabricated and connected to the plug assembly 16 in a concluding production operation. The rear region of the pin holder 5 is advantageously still accessible through the opening 24 even after prefabrication, with the result that the adhesive 7 can be easily applied. Upon subsequent insertion, the optical fiber end 3 is wetted by the adhesive. After the optical fiber end 3 has been fully inserted into the plug pin 2, a non-illustrated strain relief boot (antikink sleeve) may be pushed backward onto the rear end 20b of the housing 20 and, together with the contour of the housing, fix non-illustrated stress members. Reference is had, for additional information in this context, to the above-mentioned European disclosure 0 330 399 A1, which is herewith incorporated by reference. After assembly, the connector 1 can, if required, be inserted as a whole into an external housing 40 and latched in the latter. The housing 40 is a standardized housing to complete a so-called SC plug or push-pull plug.

We claim:

1. Fiber optic plug connector, comprising:
   a plug assembly including
      a plug pin for holding an end of an optical fiber aligned along a plug pin axis, said plug pin having a forward end defined by a plug-in direction and a rear end; and
      a helical spring concentrically surrounding said plug pin at said rear end thereof
   a single-piece housing for receiving therein said plug assembly, said housing including
      a radially closed front segment formed with a through opening in which said plug pin is axially displaceably mounted against a force of said helical spring;
      a housing side wall axially behind said front segment in the plug-in direction, said side wall having an opening formed therein through which said plug assembly is laterally insertible into said housing; and
      holding elements retaining said plug assembly in said housing and preventing said plug pin from being radially displaced, said holding elements being elastic projections of the housing projecting radially inwardly in said opening.

2. The connector according to claim 1, wherein said plug assembly further comprises a pin holder holding said plug pin at the rear end thereof, and wherein said helical spring is slipped onto said pin holder.

3. The connector according to claim 1, wherein said holding elements are tabs integrally formed on said housing side wall.

4. The connector according to claim 1, wherein said helical spring has a given outer diameter, said holding elements are spaced apart by less than said outer diameter of said helical spring, and holding elements bear against said helical spring.

* * * * *

UNITED STATES PATENT AND TRADEMARK OFFICE
CERTIFICATE OF CORRECTION

PATENT NO : 5,953,475
DATED : September 14, 1999
INVENTOR(S) : Axel Beier et al.

It is certified that error appears in the above-identified patent and that said Letters Patent is hereby corrected as shown below:

Item [63] should read as follows:

Continuation of PCT/DE96/01659, August 30, 1996.

Signed and Sealed this

Twenty-ninth Day of August, 2000

Attest:

Q. TODD DICKINSON

*Attesting Officer*     *Director of Patents and Trademarks*